United States Patent [19]
Okino et al.

[11] Patent Number: 5,214,516
[45] Date of Patent: May 25, 1993

[54] IMAGE PICKUP SYSTEM WITH AN INDICATION OF THE AUDIO SIGNAL RECORDING STATE

[75] Inventors: Tadashi Okino; Kunio Ninomiya, both of Kawasaki, Japan

[73] Assignee: Canon Kabushiki Kaisha, Tokyo, Japan

[21] Appl. No.: 817,951

[22] Filed: Jan. 6, 1992

Related U.S. Application Data

[63] Continuation of Ser. No. 563,789, Aug. 6, 1990, abandoned, which is a continuation of Ser. No. 275,672, Nov. 23, 1988, abandoned, which is a continuation of Ser. No. 906,850, Sep. 15, 1986, abandoned.

[30] Foreign Application Priority Data

Sep. 20, 1985 [JP] Japan .................................. 60-209310
Sep. 20, 1985 [JP] Japan .................................. 60-209311

[51] Int. Cl.$^5$ ........................................... H04N 5/781
[52] U.S. Cl. ............................. 358/342; 358/343; 358/906; 360/6; 360/31; 369/53
[58] Field of Search ............... 358/335, 341, 342, 343, 358/906; 360/6, 25, 27, 31, 137; 369/22, 25, 28, 53, 54; 379/74, 77

[56] References Cited

U.S. PATENT DOCUMENTS

| | | | |
|---|---|---|---|
| 3,335,219 | 8/1967 | Goldmark et al. | 358/341 |
| 3,673,332 | 6/1972 | Muller et al. | 379/74 |
| 3,725,589 | 4/1973 | Golden | 379/77 X |
| 4,097,893 | 6/1978 | Camras | 358/906 X |
| 4,325,081 | 4/1982 | Abe et al. | 358/335 |
| 4,399,527 | 8/1983 | Titus, IV et al. | 369/28 |
| 4,467,371 | 8/1984 | Kobayashi et al. | 358/335 X |
| 4,531,161 | 7/1985 | Murakoshi | 358/341 X |
| 4,532,558 | 7/1985 | Dota et al. | 358/906 X |
| 4,589,045 | 5/1986 | Koyama | 360/137 |
| 4,628,390 | 12/1986 | Motoyama et al. | 369/25 X |
| 4,631,601 | 12/1986 | Brugliera et al. | 358/335 |
| 4,641,203 | 2/1987 | Miller | 358/335 |

*Primary Examiner*—W. R. Young
*Attorney, Agent, or Firm*—Fitzpatrick, Cella, Harper & Scinto

[57] ABSTRACT

In a camera device including a recording device which records an image signal and an audio signal, the recording device includes a display device which indicates that the recording device is in the audio signal recording period. When the display device is composed of a sound generating medium, the display device and the sound generation medium are operated alternately so that sound by the sound generating medium does not affect the audio signal.

26 Claims, 7 Drawing Sheets

IMAGE PICKUP SYSTEM WITH AN INDICATION OF THE AUDIO SIGNAL RECORDING STATE

This application is a continuation of application Ser. No. 07/563,789 filed Aug. 6, 1990 which is a continuation of application Ser. No. 07/275,672 filed Nov. 23, 1988, which is a continuation of application Ser. No. 06/906,850 filed Sep. 15, 1986, all now abandoned.

BACKGROUND OF THE INVENTION

FIELD OF THE INVENTION

The present invention relates to recording apparatus and more particularly to a recording apparatus which is capable of recording an audio signal and a video signal together.

RELATED BACKGROUND ART

Among recording apparatus having an image pick up function similar to that of conventional electronic cameras, there are some recording apparatus considered which are constructed so as to record not only a video signal but also an audio signal for a given interval.

For voice recording, however, it is impossible to accurately recognize a time elapsed since the beginning of recording signals or the time remaining.

Therefore when a conventional apparatus of this type is used, it is impossible to record an audio signal as the user desires.

SUMMARY OF THE INVENTION

It is a first object of the present invention to eliminate the above drawbacks.

It is a second object of the present invention to provide a recording apparatus which records a video signal and an audio signal together and which plainly displays the audio signal recording state.

It is a third object of the present invention to provide a recording apparatus which plainly displays the time elapsed since recording of an audio signal started or the remaining recordable time.

Under such objects, according to a preferred embodiment of the present invention, there is provided a recording apparatus comprising first recording means for recording a video signal, second recording means for recording an audio signal synchronously with the video signal, and display means for displaying the recording time of the audio signal recorded by said second recording means.

It is a further object of the present invention to provide a recording apparatus which records audio information without being influenced by the ambient noise.

Under such objects, according to a preferred embodiment of the present invention, there is disclosed a recording apparatus comprising pick up means for picking up an audible sound, recording means for recording a video signal and an audio signal obtained from the pick up means, and information sound generator means for producing a predetermined information sound, wherein the pickup means and the information sound generator means are operated alternately.

Other objects and features of the present invention will be apparent from the following description of an embodiment of the present invention.

DESCRIPTION OF PREFERRED EMBODIMENTS

Figure 1:
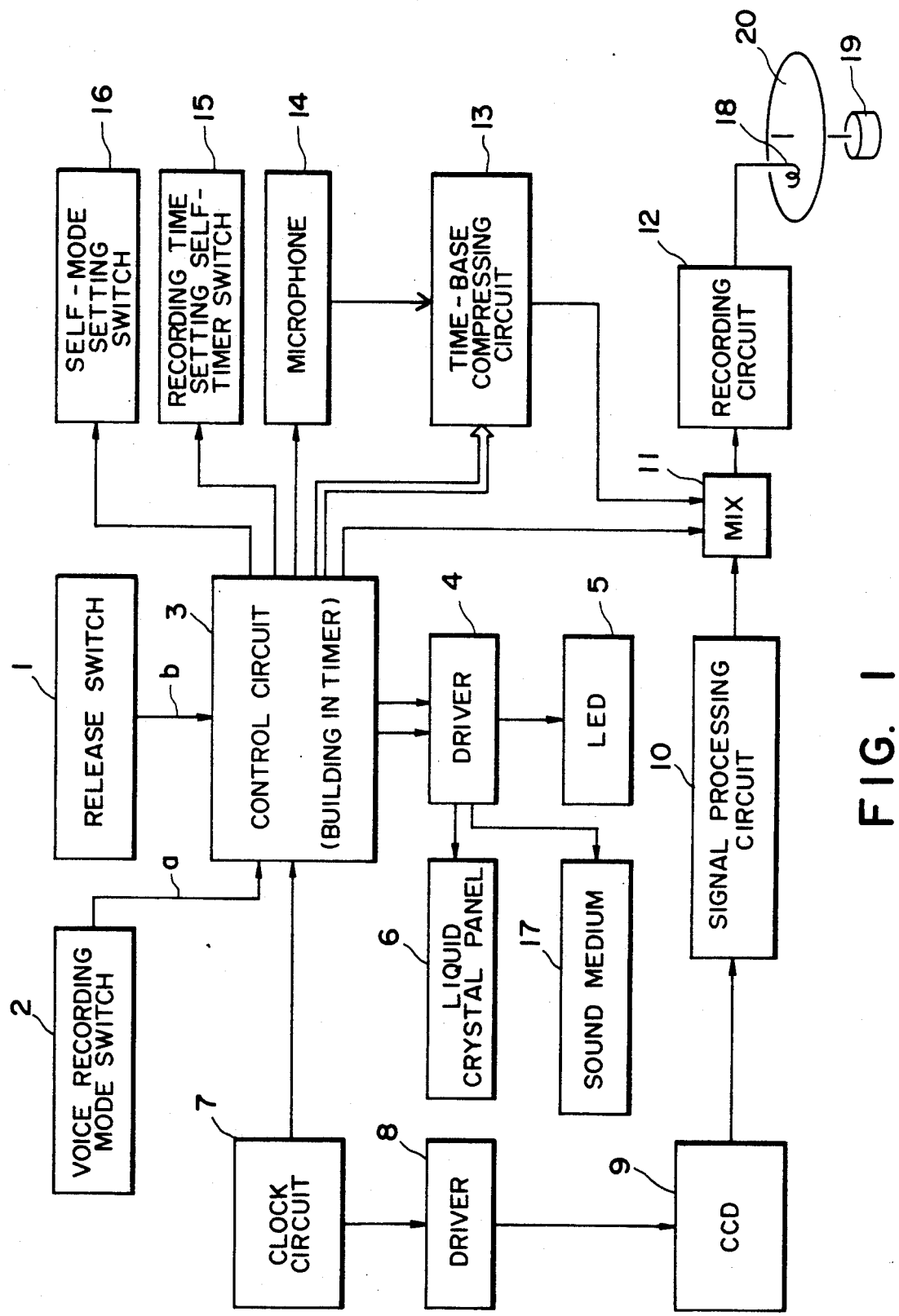
FIG. 1 is a block diagram showing the structure of a first embodiment of the present invention.

Now an electronic camera will be described which is a recording apparatus as one embodiment of the present invention, using the drawings. FIG. 1 is a block diagram showing the structure of such an electronic camera. In FIG. 1, a release switch 1 is used to give instructions that recording of an image and voice should be started. A voice recording mode switch 2 designates either a voice recording mode or a non-voice recording mode.

A control circuit 3 has a timer function and operates in response to release switch 1 and mode switch 2. A driver 4 drives a liquid crystal panel 6 and a LED 5.

A clock circuit 7 clocks control circuit 3 and an image sensor driver 8. An image sensor 9 comprises a CCD, for example. A video signal processing circuit 10 processes a video signal from the image sensor 9.

A mix circuit 11 selects between the audio signal and a video signal, mixes them and outputs the resulting signal. A recording circuit 12 records a video signal and an audio signal on a medium comprising a disc 20. A microphone 14 picks up voice.

An audio signal time-base compressing circuit 13 compresses the audio signal time-base so that the audio signal falls within substantially the same band as the video signal, and processes the audio signal so that it can be recorded in a short time. A self-mode setting switch 16 sets a self-timer mode. A recording time setting self-timer switch 15 sets a self-timer time when the self mode is set by self-mode setting switch 15, and sets a voice recording time when the self-mode is not set.

A sound generating medium 17 is driven together with LED 5 by driver 4, and displays an time elapsed since self-timer operation or voice recording started. A bed 18 records a signal on medium 20. A motor 19 rotates medium 20.

Now the structure of the time-base compression circuit 13 will be described with reference to FIG. 2A.

Figure 2B:
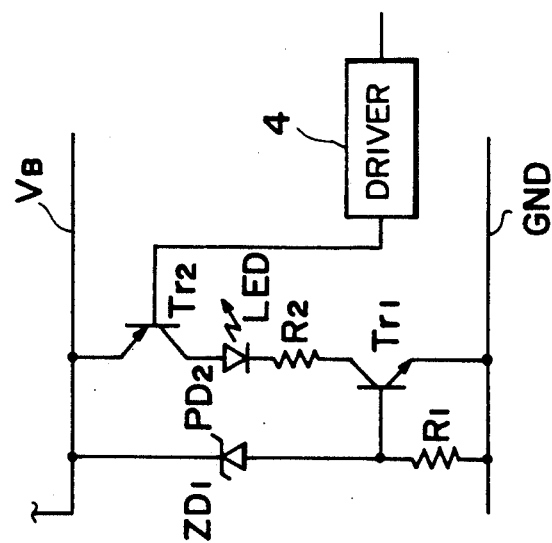
FIGS. 2A and 2B are block diagrams showing in detail the structure of the essential portion of FIG. 1.
Figure 2A:
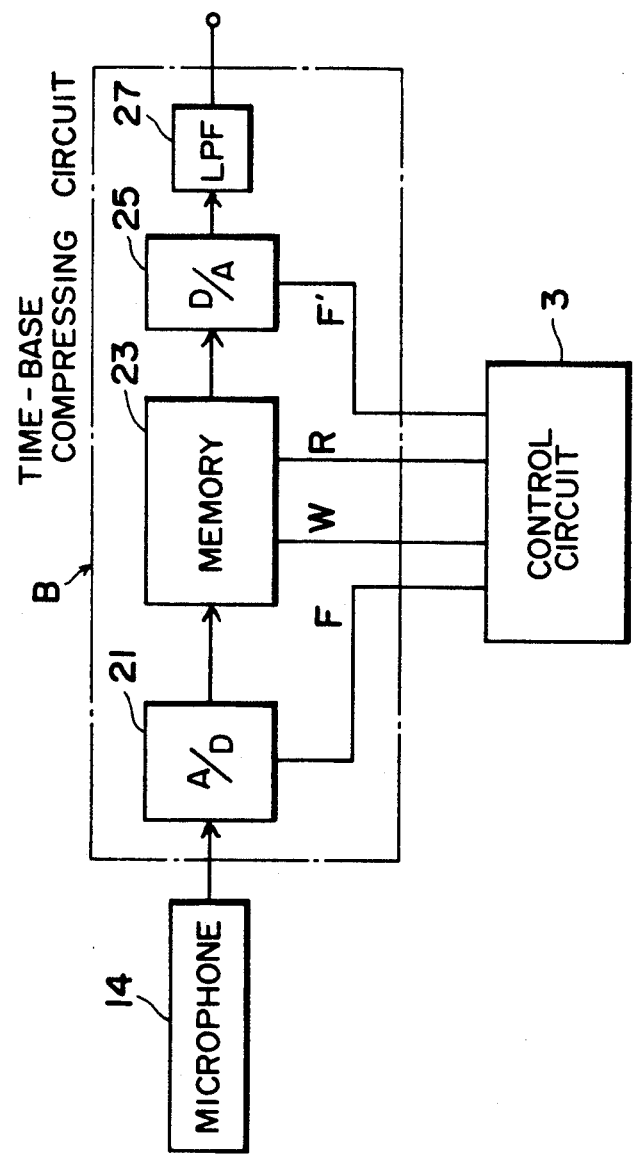

In FIG. 2A, an A/D converter 21 performs an A/D conversion on an audio signal from microphone 14. A memory 23 stores the audio signal which is A/D converted by A/D converter 21, and is controlled by control circuit 3 with reference to writing and reading.

A D/A converter 25 converts the information read out of memory 23 to an analog signal.

A low-pass filter 27 filters out high harmonic components from the outputs of D/A converter 25. Control circuit 3 also controls the conversion timing by A/D and D/A converters 21 and 25.

Now the operation of this embodiment will be described. In order to record voice simultaneously when an image is picked up, voice recording mode switch 2 is initially switched to the voice recording mode side. This causes control circuit 3 to operate to set the voice recording time to a present time limit (for example, 10-second mode).

At the same time, microphone 14 is set to a voice recording standby state.

At this time, control circuit 3 delivers a predetermined signal via a driver 4 to liquid crystal panel 6, so that panel 6 displays the message "voice recording standby" or "voice mode".

When release switch 1 is then pressed, the video signal from image sensor element 9 is delivered via a signal processing circuit 10 to mix circuit 11, and then to recording circuit 12. Driver 4 responds to a signal from control circuit 3 to cause LED 5 to emit light, which will be described in more detail with reference to FIG. 3. At the same time, liquid crystal panel 6 is also driven, thereby displaying the remaining recording time. Of course, in the meantime, voice is picked up by microphone 14, and the resulting audio signal is compressed with time base by being written into a memory 23 in time-base compression circuit 13. Thereafter, the compressed audio signal is mixed with the video signal at mix circuit 11 and then delivered to recording circuit 12 to be recorded on disc 20.

While in this embodiment, the compressed audio signal and video signal are mixed and recorded, the mix circuit may be operated as a switching circuit, as mentioned above, to record the audio signal and the video signal separately when these signals cannot be mixed.

Now the operation of the above embodiment will be described with reference to FIG. 3.

Figure 3:
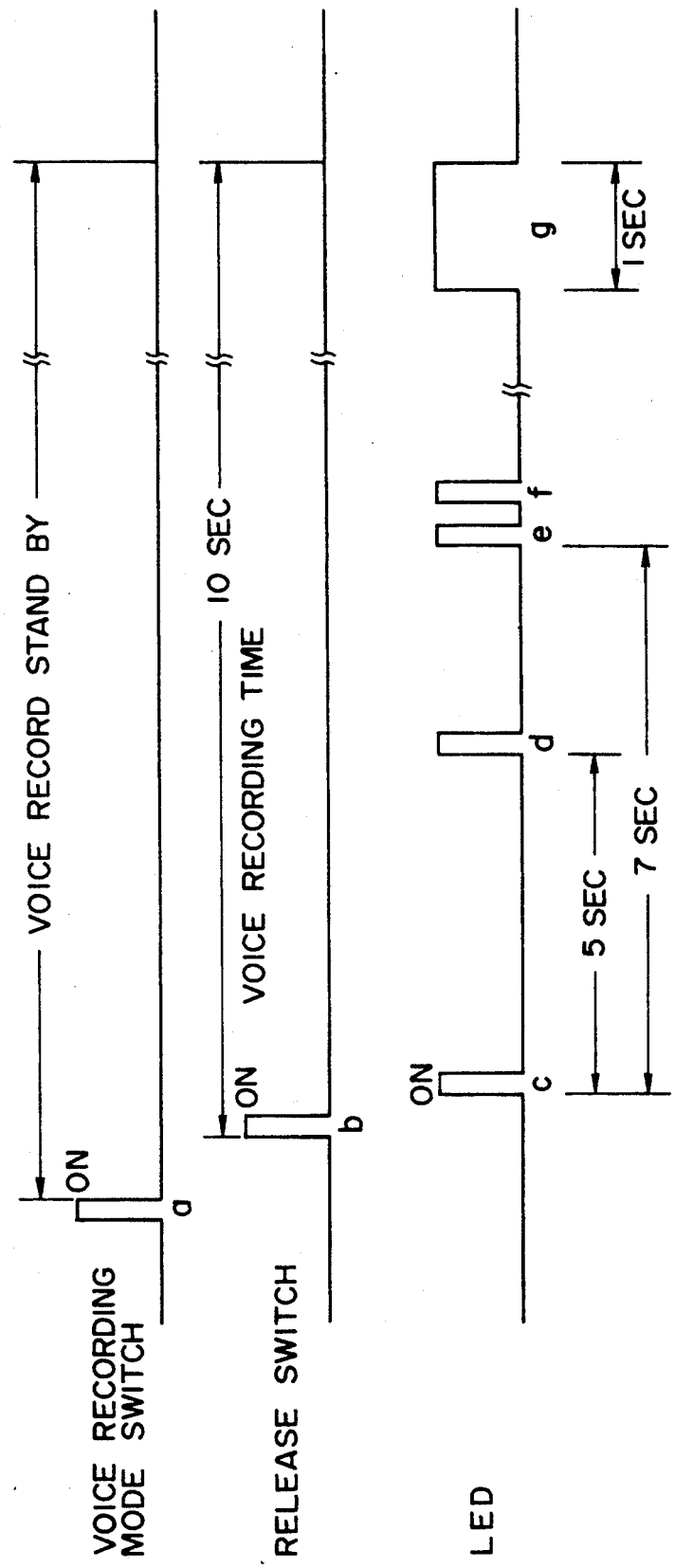
FIG. 3 is a timing chart for explaining the operation of the embodiment of FIG. 1.

FIG. 3 is a timing chart for explaining the operation of the embodiment shown in FIG. 1.

As shown in FIG. 3, when voice recording mode switch 2 is turned on (that is, voice recording mode), a pulse a is delivered to control circuit 3 to cause the voice recording circuit system to be put in the standby state.

Release switch 1 is then pressed, a pulse b is delivered to control circuit 3 and the voice recording mode continues for a time interval (for example, 10 seconds) preset in a timer in the control circuit 3. Thus, the audio signal from microphone 14 is written into memory 23 within time-base compression circuit 13. When the voice recording time expires, the audio signal written into memory 23 is read by control circuit 3 and delivered via mix circuit 11 to recording circuit 12 thereby to be written into a medium (not shown).

While the audio signal is being written into memory 23, LED driver 4 delivers drive pulses c, d, e, f and g to LED 5 to flash same. That is, at the start of recording (at a rise of pulse c), first, LED 5, flashes once, then after elapse of five seconds, the LED 5 flashes once more by a pulse d. Then, after elapse of seven seconds, LED 5 flashes twice by pulses e, f. LED 5 remains emitting light during the remaining one-second recording time by pulse g. As soon as the voice recording time has ended, LED 5 ends emission of light. That is, in this embodiment, the elapse of the voice recording time is displayed by changing the form of display by the display means.

Figure 4:
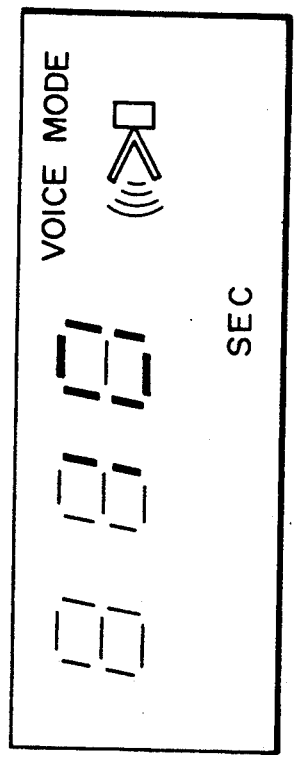
FIG. 4 is a plan view showing an example of display by a liquid crystal panel 6 shown in FIG. 1.

As shown in FIG. 4, characters and figures representing the voice recording mode and numerals representing the recording time are displayed on liquid crystal 6 in the voice recording standby mode (i.e., at the rise of pulse a). Then, after recording has started, the remaining time (the remaining voice recording time) is displayed every second. Thus, the time kept by the control circuit 3 is decoded by driver 4 and sent to liquid panel 6.

Figure 5B:
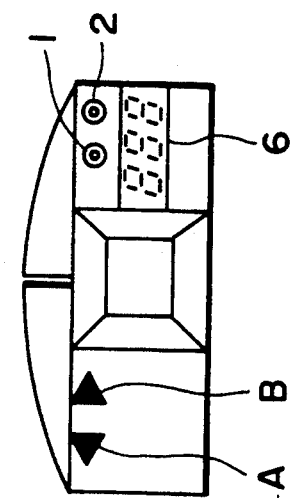
FIGS. 5A and 5B show the external appearance of a device according to the embodiment of FIG. 1.
Figure 5A:
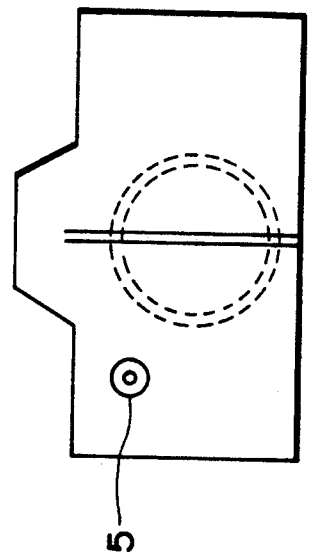

FIG. 5A shows the external appearance of an electronic camera, as viewed from the rear, to which the present invention is applied. While LED 5 is on the rear of the camera, it may be on the front of the camera. FIG. 5B is a top view of the camera where liquid crystal panel 6 is shown. Up and down switches A and B adjust the voice recording time in FIG. 5B.

Now another embodiment will be described.

While in the first embodiment, the voice recording mode and the remaining time for voice recording are displayed by flashing the LED, this LED may also be used for performing the self-timer display simultaneously. Namely, the self-timer function in the voice recording mode may be displayed by flashing the LED.

That is, when the self-mode switch 16 is turned on, control is possible so as to display an elapsed time of the self-timer by flashing the LED.

Several kinds of voice recording times and self-timer setting times may be programed in advance. In that case, if switches A, B shown in FIG. 5B are pressed, it will be possible to display numerals indicative of the voice recording times and self-timer setting times on the liquid crystal panel. This allows the self-timer times, etc., to be varied although there has been only a single kind of such times in the past.

According to this embodiment, the display which displays the voice recording time also displays the self-timer time, so that it is unnecessary to increase the number of displays excessively and there is no probability that both the display contents will be confused.

LED 5 may be used as a display for checking the battery as well.

Referring to FIG. 2B, an embodiment will be described wherein LED 5 is also used as a display for checking the battery.

In order to provide this embodiment with such function, in the embodiment, the driver 4 and the LED 5, shown in FIG. 1, are constructed as shown in FIG. 2B. In FIG. 2B, a power source (not shown) is connected to a line VB. Reference characters ZD1 and R1 denote a Zener diode and a resistor, respectively. A transistor Tr1 has a base connected to the junction between Zener diode ZD1 and resistor R1, and an emitter connected to ground GND.

Transistor Tr1 has a resistor R2 connected to the collector thereof. A LED RD2 displays the voice recording time and the battery state. A transistor Tr2 has an emitter, a collector and a base connected to a line VB, LED PD and driver 4, respectively.

Now, the operation of the circuit shown in FIG. 2B will be described. When the cells or battery are charged enough, the potential at line VB is high enough, so that a fixed biasing voltage is applied through Zener diode ZD1 and resistor R1 to the base of transistor Tr1. Thus, only during the time when the transistor Tr2 is turned on by a drive pulse from driver 4, current flows through the collector of Tr1, and LED PD2 emits light, thereby displaying a time elapsed since voice recording started. When the cell and the battery are insufficiently charged and the potential at line VB is low, the biasing voltage applied to the base of the transistor Tr1 is low and the transistor Tr1 is cut off. As the result, no current flows through the collector of Tr2 in spite of driving by driver 4 and LED PD does not emit light.

Since in this embodiment, LED PD2 emits light when the source voltage is sufficiently high, whereas LED PD2 stops emission of light when the source voltage is not sufficiently high, the time elapsed since voice recording and battery checking started are displayed by LED PD2.

In the above embodiment, in addition to display by the LED or the liquid crystal panel, the sound generating medium is provided which posts an elapse of voice recording time by sound. Therefore, the operator can know an elapse of voice recording time although he or she does not attend to the camera device. However, sound produced by the camera device may be mixed disadvantageously with sound to be recorded.

An example will be described which is free from such drawback with reference to FIG. 6.

Figure 6:
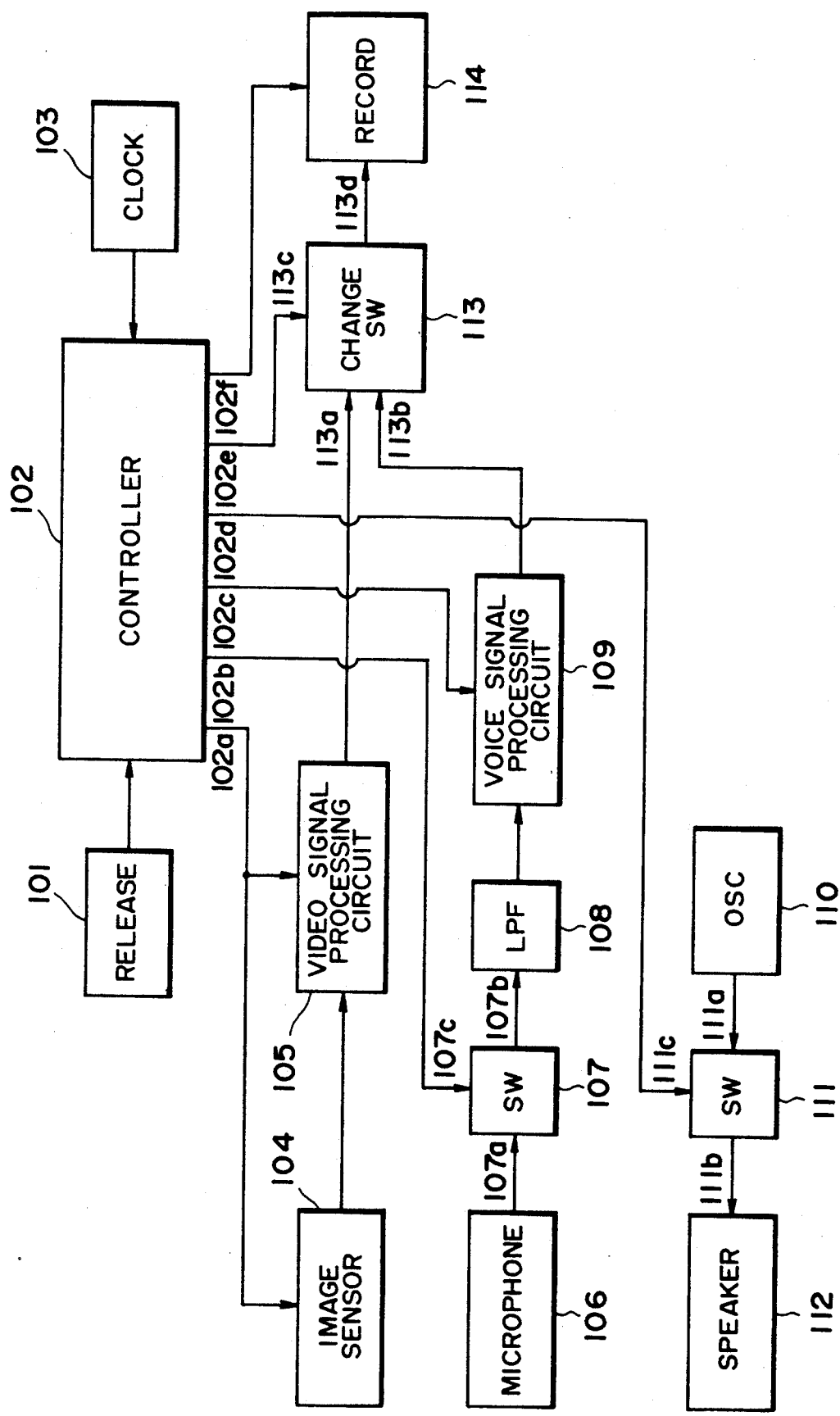
FIG. 6 is a block diagram showing the structure of a second embodiment of the present invention.

FIG. 6 is a block diagram showing the structure of the above embodiment. Here, a camera device which picks up an image frame by frame is included. In this camera, a voice is recorded for a given time after a release switch 101 is pressed. The starting and ending of voice recording are posted by sound from the camera device. This will be described in more detail hereinafter.

In FIG. 6, a release switch 101 is pressed to start to pick up an image and a sound and records them.

A controller 102 controls the operation of the entire camera device. In response to a reference clock signal from a clock generator 103, the controller produces various pulse signals which are delivered by output terminals 102a, 102b, 102c, 102d, 102e and 102f to the corresponding portions of the camera device at appropriate times to control those portions.

An image sensor 104 converts an optical image of a subject to an electrical signal and is composed of, for example, a CCD. A video signal processing circuit 105 processes a video signal output from image sensor element 104 and produces an output signal which is delivered to a video input terminal 113a of a change switch circuit 113.

A microphone 106 converts a sound from the subject to an electrical signal. It produces an output signal which is supplied to an input terminal 107a of a switch 107. When a control pulse delivered to a control terminal 107c of the switch 107 is high, an electrical path between the input and output terminals 107a and 107b becomes conductive. When the control pulse supplied to control terminal 107c is low, the electrical path becomes interrupted.

A low-pass filter 108 filters out unnecessary components mixed with an audio signal and supplies its output signal to a voice signal processing circuit 109, as will be described later in more detail. The output signal from the voice signal processing circuit 109 is input to a voice input terminal 113b of change switch circuit 113.

A recording circuit 114 records an output signal from the output terminal 113d of change switch circuit 113.

In change switch circuit 113, when the control signal at a control terminal 113c of the circuit 113 is high, an electrical circuit between the input and output terminals 113a and 113d becomes conductive. That is, the change switch circuit 113 allows a video signal from the video signal processing circuit 105 to pass therethrough i.e., providing a video recording mode. When the control signal at control terminal 113c is low, an electrical path between the input and output terminals 113b and 113d becomes conductive. That is, the change switch circuit 113 allows a voice signal from the voice signal processing circuit 109 to pass therethrough, i.e., providing a voice recording mode.

Reference numerals 110, 111 and 112 denote an information sound oscillator, a switch and an information sound loudspeaker, respectively. The output signal from the oscillator 110 is input to an input terminal 111a of the switch 111. The output terminal 111b of the switch 111 is connected to loudspeaker 112. When the control terminal 111c of switch 111 is at high level, the electrical path between input and output terminals 111a and 111b are rendered conductive, so that an information sound signal from the oscillator 110 passes to loudspeaker 112, and issed as an information sound from loudspeaker 112.

In controller 102, the output terminal 102a is connected to image sensor element 104 and video signal processing signal 105; the output terminal 102b to switch control terminal 107c, the output terminal 102c to audio signal processing circuit 109; the output terminal 102d to switch control terminal 111c, the output terminal 102e to control terminal 113c of change switch circuit 113; the output terminal 102f to recording circuit 114, in order to control the operation of these elements by the corresponding output signals from the controller 102.

The operation of this embodiment will be described with reference to the timing charts of FIGS. 7 and 8.

Figure 7:
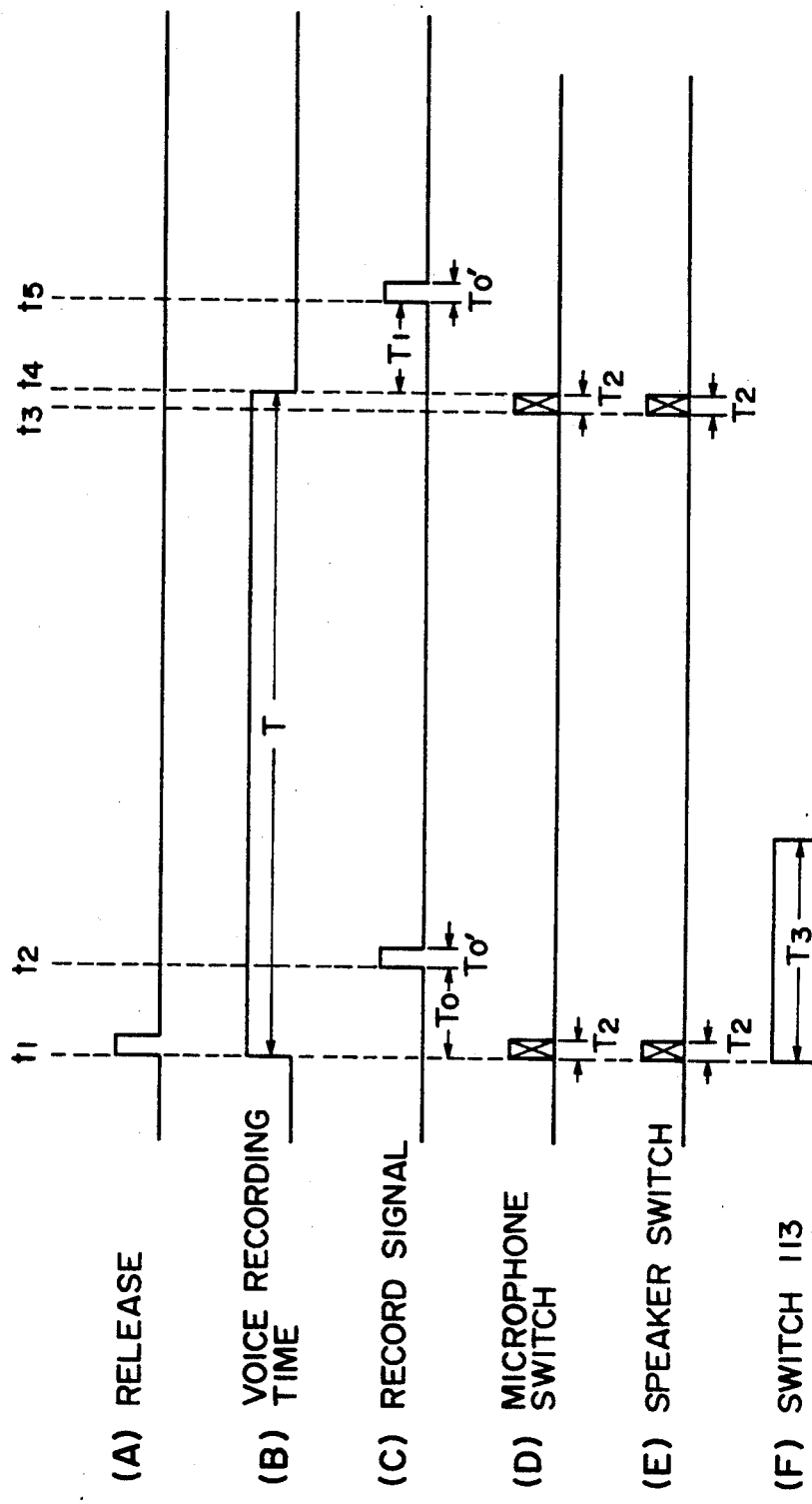
FIGS. 7(A-F) and 8(A-F) are timing charts for explaining the operation of the embodiment shown in FIG. 6.

As shown in FIG. 7 (A), first, if release switch 1 is pressed at time $t_1$, a sound from a subject can be recorded for a given time interval T only, as shown in FIG. 7 (B). The control pulse output from the controller output 102b becomes high during time interval T only from time $t_1$. Thus, the electrical path between input and output terminals 107a and 107b of switch 107 is rendered conductive, and so the audio signal is picked up by voice processing circuit 109.

In response to pressing release switch 101, the image sensor 104 is exposed to an appropriate quantity of light from a well-known exposure means and thus the image is converted to an electrical signal. As shown in FIG. 7 (C), after an elapse of a required predetermined time $T_0$, a control pulse from the controller output terminal 102a causes video signal processing circuit 5 to read the video signal from image sensor 104 for an interval $T_0'$ only, process and record the video signal. In this case, since, as shown in FIG. 7 (F), the control pulse from the controller output terminal 102e is selected to be at high level for the time interval $T_3$, which is greater than $(T_0+T_0')$ immediately after the release switch is pressed, the input signal at control terminal 113c of change switch circuit 113 is also at high level for that time interval. Therefore, the electrical circuit between input and output terminals 113a and 113d is rendered conductive, thereby recording the video signal for the time interval $T_0'$.

The video signal during the time interval T is input to and stored temporally in a memory of the voice processing circuit 109, as mentioned above. After an elapse of time T, the audio signal is read at high speeds from the memory, i.e., compressed with respect to time base, and recorded by the recording circuit 114 for the time interval $T_0'$ from time $t_5$ after $T_1$.

Since it is selected so that $T_3$ is less than T, the change switch control terminal 113c is at low level at this time. Therefore, the electrical circuit between input and output terminals 113b and 113d becomes conductive and only the audio signal is recorded.

A control pulse for voice recording during the time $T_0'$ starting from time $t_5$ is delivered from controller output terminal 102f.

In this embodiment, switch 111 is turned on during the intervals T only from the voice recording start point $t_1$ when the release switch 101 is pressed and from the time $t_3$ immediately before the time $t_4$ when the voice recording ends, so that the loudspeaker 112 produces an information sound, thereby informing the operator on the side of the subject of the beginning and ending of voice recording.

However, the information sound would be mixed with the voice to be recorded through the microphone 106.

In this embodiment, the following measures are taken in order to prevent sounds, namely, information sounds from the loudspeaker 112, from being mixed with the sound to be recorded.

Such measures will be described with reference to FIG. 8. FIG. 8 is a timing chart in which the time interval $T_2$ starting from time $t_1$ or $t_3$ is shown on enlarged scale.

Figure 8:
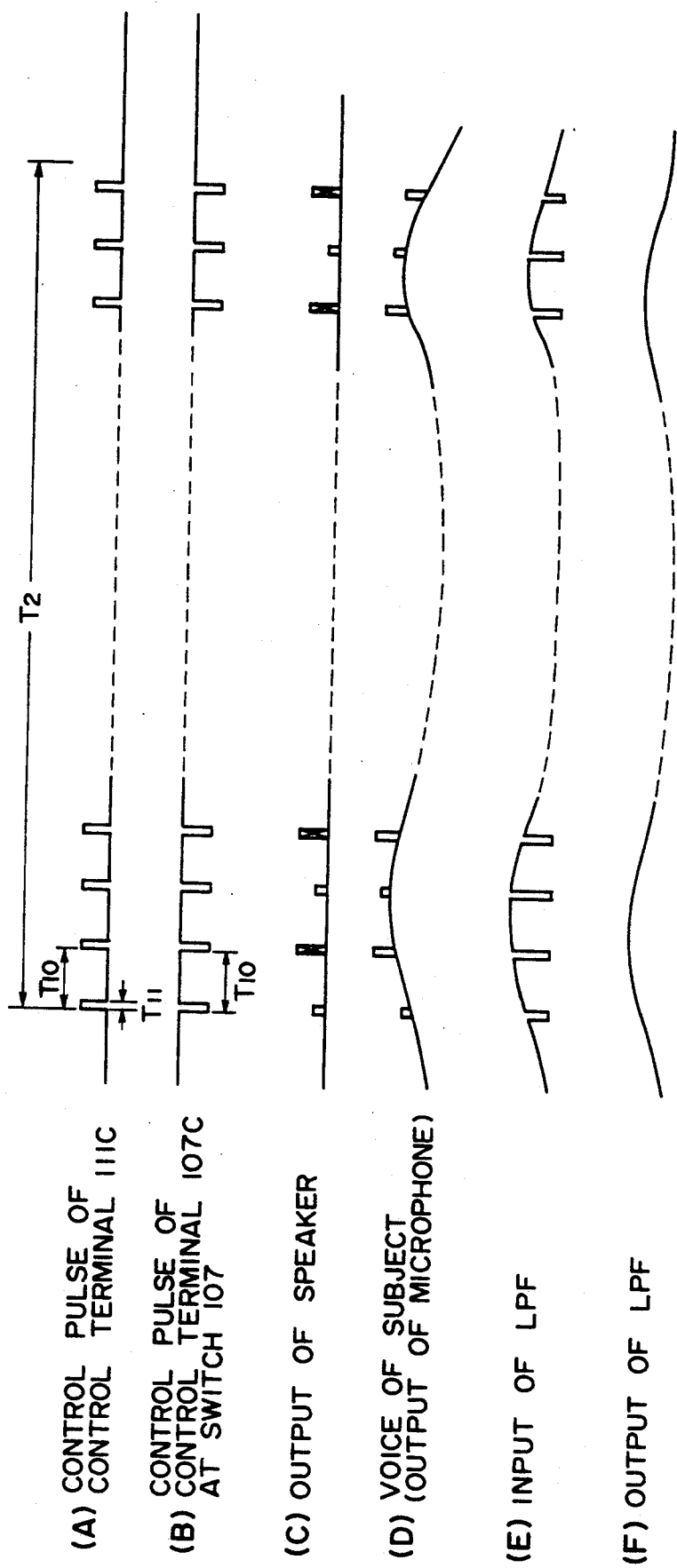

FIG. 8 (A) is the waveform of incoming control pulses at the switch control terminal 111c. FIG. 8 (B) is the waveform of incoming control pulses at switch control terminal 107c. These waveforms are opposite in polarity. These pulses are produced at time intervals $T_{10}$ and have a time width of $T_{11}$ each within the time interval $T_2$.

Thus, the audio signals from microphone 106 and information sound signals delivered to the loudspeaker 112 are outputted from the switches 107 and 111 alternately. That is, the loudspeaker 112 produces an information sound only when the control pulse (see FIG. 7 (A)) is at high level, as shown in FIG. 8 (C), thereby allowing the subject side to be informed of the beginning and ending of image picking up. In this embodiment, the subject side may be informed of the information sound at the timings c, d, e, f and g of FIG. 3.

The microphone 106 picks up sounds from the subject and from the loudspeaker in superimposed relationship. The switch 107 is rendered non-conductive only during the interval when the loudspeaker 112 is producing sound, so that the information sound components included in the waveform of a signal input to the low-pass filter 108 are filtered out, as shown in FIG. 8 (E).

Since the low-pass filter 108 eliminates these control pulse components, the filter output takes the waveform from which the loudspeaker output is removed, as shown in FIG. 8 (F), so that only the voice free from the information sound is recorded.

As described above, according to the present embodiment, the information sound produced from the side of the camera device is prevented from being mixed with the sound to be recorded, so that the operator is informed of various information including the beginning and ending of recording of the audio signal by means of various information sounds.

Needless to say, the contents of an information sound may be modified so as to be used as the explanation for the operation of the camera device or as various alarms.

What we claim is:

1. An audio recording apparatus comprising:
 a) means for converting a sound to an audio signal;
 b) means for generating a sound representing a recording condition of said apparatus during a conversion operation of said converting means, said sound generated by said generating means being available to said converting means;
 c) means for recording the audio converted by said converting means on a medium; and
 d) control means for controlling said converting means such that the audio signal converted by said converting means does not include an audio signal corresponding to the sound generated by said generating means without acoustical isolation, wherein said generating means generates a sound representing the duration of the audio signal recorded by said recording means.

2. An apparatus according to claim 1, wherein said medium comprises a disc medium.

3. An apparatus according to claim 1, further comprising means for generating a recording trigger signal.

4. An apparatus according to claim 3, wherein said generating means generates said recording trigger signal in response to manual operation.

5. An audio recording apparatus comprising:
 a) means for converting a sound to an audio signal;
 b) means for generating a sound representing a recording condition of said apparatus during a conversion operation of said converting means, said sound generated by said generating means being available to said converting means;
 c) means for recording the audio converted by said converting means on a medium; and
 d) control means for controlling said converting means such that the audio signal converted by said converting means does not include an audio signal corresponding to the sound generated by said generating means without acoustical isolation; and
 e) means for converting an image to a video signal and wherein said recording means records the video signal on the medium.

6. An apparatus according to claim 5, wherein said medium comprises a disc medium.

7. An apparatus according to claim 5, further comprising means for generating a recording trigger signal.

8. An apparatus according to claim 7, wherein said generating means generates said recording trigger signal in response to manual operation.

9. An audio recording apparatus comprising:
 a) means for converting a sound to an audio signal;
 b) means for generating a sound representing a condition of said apparatus;
 c) means for recording the audio signal on a medium; and
 d) control means for controlling the sound generated by said generating means so as not to be recorded on the medium, wherein said control means controls said converting means and generating means so that said converting and said generating means do not operate simultaneously and wherein said generating means generates a sound representing the duration of the audio signal recorded by said recording means.

10. An apparatus according to claim 9, wherein said medium comprises a disc medium.

11. An apparatus according to claim 9, further comprising means for generating a recording trigger signal.

12. An apparatus according to claim 11, wherein said generating means generates said recording trigger signal in response to manual operation.

13. An apparatus according to claim 9, further comprising means for converting an image to a video signal and wherein said recording means records the video signal on the medium.

14. An audio and video recording apparatus comprising:
   a) means for converting a sound to an audio signal;
   b) means for generating a sound representing a condition of said apparatus;
   c) means for recording the audio signal on a medium; and
   d) control means for controlling the sound generated by said generating means so as not to be recorded on the medium, wherein said control means controls said converting means and generating means so that said converting and said generating means do not operate simultaneously and further comprising means for converting an image to a video signal and wherein said recording means records the video signal on the medium.

15. An apparatus according to claim 14, wherein said medium comprises a disc medium.

16. An apparatus according to claim 14, further comprising means for generating a recording trigger signal.

17. An apparatus according to claim 16, wherein said generating means generates said recording trigger signal in response to manual operation.

18. An audio recording apparatus comprising:
   a) means for converting a sound to an audio signal;
   b) means for generating a sound representing a condition of said apparatus;
   c) means for recording the audio signal on a medium; and
   d) means for controlling the sound generated by said generating means so as not to be recorded on the medium, wherein said generating means is generating the sound, said control means inhibits the audio signal converted by said converting means from being transmitted to said recording means, and wherein said generating means generates a sound representing the duration of the audio signal recorded by said recording means.

19. An apparatus according to claim 18, wherein said medium comprises a disc medium.

20. An apparatus according to claim 18, further comprising means for generating a recording trigger signal.

21. An apparatus according to claim 20 wherein said generating means generates said recording trigger signal in response to manual operation.

22. An apparatus according to claim 18, further comprising means for converting an image to a video signal and wherein said recording means records the video signal on the medium.

23. An audio and video recording apparatus comprising:
   a) means for converting a sound to an audio signal;
   b) means for generating a sound representing a condition of said apparatus;
   c) means for recording the audio signal on a medium; and
   d) control means for controlling the sound generated by said generating means so as not to be recorded on the medium, wherein when said generating means is generating the sound, said control means inhibits the audio signal converted by said converting means from being transmitted to said recording means, and further comprising means for converting an image to a video signal and wherein said recording means records the video signal on the medium.

24. An apparatus according to claim 23, wherein said medium comprises a disc medium.

25. An apparatus according to claim 23, further comprising means for generating a recording trigger signal.

26. An apparatus according to claim 25 wherein said generating means generates said recording trigger signal in response to manual operation.

* * * * *

UNITED STATES PATENT AND TRADEMARK OFFICE
CERTIFICATE OF CORRECTION

PATENT NO. : 5,214,516

DATED : May 25, 1993

INVENTOR(S) : TADASHI OKINO ET AL.

It is certified that error appears in the above-identified patent and that said Letters Patent is hereby corrected as shown below:

COLUMN 1

Line 14, "to" should read --to a--.

COLUMN 2

Line 31, "a" (second occurrence) should read --an--.
Line 51, "an" should read --a--.

COLUMN 3

Line 56, "LED 5," should read --LED 5--.

COLUMN 4

Line 52, "A" should read --An--.

COLUMN 6

Line 15, "issed" should read --is issued--.

COLUMN 7

Line 39, "ending" should read --end-- and "picking" should read --pick--.

UNITED STATES PATENT AND TRADEMARK OFFICE
CERTIFICATE OF CORRECTION

PATENT NO. : 5,214,516
DATED : May 25, 1993
INVENTOR(S) : TADASHI OKINO ET AL.

It is certified that error appears in the above-identified patent and that said Letters Patent is hereby corrected as shown below:

<u>COLUMN 10</u>

Line 21, "control" should be deleted.
Line 35, "claim 25" should read --claim 25,--.

Signed and Sealed this

Twelfth Day of April, 1994

Attest:

BRUCE LEHMAN

Attesting Officer

Commissioner of Patents and Trademarks